United States Patent [19]
Flynn et al.

[11] Patent Number: 5,582,691
[45] Date of Patent: Dec. 10, 1996

[54] OCEAN THERMAL ENERGY CONVERSION (OTEC) SYSTEM

[76] Inventors: Robert J. Flynn, 10302 Brandenburg Ct.; George J. Cicchetti, 10300 Bradenburg Ct., both of Great Falls, Va. 22066; Jonathan d'E. Coony, 2010 Kalorama Rd., NW. Apt. 35, Washington, D.C. 20009

[21] Appl. No.: 166,005

[22] Filed: Dec. 14, 1993

[51] Int. Cl.$^6$ .............................. B01D 3/06; C02F 1/06; F03G 7/05

[52] U.S. Cl. .............................. 203/11; 60/641.7; 60/651; 159/2.1; 159/DIG. 31; 159/DIG. 32; 159/DIG. 38; 202/186; 202/197; 202/235; 203/21; 203/40; 203/87; 203/88; 203/DIG. 9; 203/DIG. 8; 203/DIG. 16; 203/DIG. 17; 203/DIG. 20

[58] Field of Search ................... 202/197, 186, 202/160, 235; 203/10, 11, 2, 40, 88, 87, 4, 90, 100, DIG. 8, 21, DIG. 16, DIG. 17, DIG. 20, DIG. 9; 159/2.1, 3, DIG. 16, DIG. 31, DIG. 32, DIG. 38, 23, 902; 60/398, 641.7, 648, 651

[56] References Cited

U.S. PATENT DOCUMENTS

| | | |
|---|---|---|
| 2,006,985 | 7/1935 | Claude et al. . |
| 3,075,828 | 1/1963 | Kato et al. ............ 159/DIG. 38 |
| 3,340,159 | 9/1967 | Tidball et al. ............ 159/DIG. 38 |
| 3,476,654 | 11/1969 | Sieder ............ 159/DIG. 31 |
| 3,928,145 | 12/1975 | Othmer . |
| 3,967,449 | 6/1976 | Beck . |
| 3,986,938 | 10/1976 | Smith, Jr. ............ 203/11 |
| 4,046,639 | 9/1977 | Carson . |
| 4,046,640 | 9/1977 | Carson . |
| 4,055,145 | 10/1977 | Mager et al. . |
| 4,072,579 | 2/1978 | Carson . |
| 4,078,975 | 3/1978 | Spears, Jr. ............ 203/10 |
| 4,083,189 | 4/1978 | Fetkovich . |
| 4,091,623 | 5/1978 | Edmondson et al. . |
| 4,094,747 | 6/1978 | Pfenninger . |
| 4,110,174 | 8/1978 | Carson . |
| 4,121,977 | 10/1978 | Carson . |
| 4,132,075 | 1/1979 | Fleck et al. . |
| 4,138,851 | 2/1979 | Rogers et al. . |
| 4,152,898 | 5/1979 | Awerbuch . |
| 4,189,647 | 2/1980 | Wittig . |
| 4,189,924 | 2/1980 | LaCoste . |
| 4,210,819 | 7/1980 | Wittig et al. . |
| 4,210,820 | 7/1980 | Wittig . |
| 4,216,657 | 8/1980 | Ridgway . |
| 4,302,297 | 11/1981 | Humiston . |
| 4,302,682 | 11/1981 | LaCoste . |
| 4,370,859 | 2/1983 | Assaf . |
| 4,430,861 | 2/1984 | Avery . |
| 4,441,321 | 4/1984 | Ridgway . |
| 4,475,342 | 10/1984 | Assaf . |
| 4,601,731 | 7/1986 | Michelson ............ 55/257.2 |
| 4,726,191 | 2/1988 | Kawamura . |
| 4,907,410 | 2/1990 | Chang . |
| 5,096,543 | 3/1992 | Elmore ............ 203/10 |
| 5,156,706 | 10/1992 | Sephton ............ 159/DIG. 38 |
| 5,207,875 | 5/1993 | Zapka et al. . |
| 5,464,459 | 11/1995 | Van Buskirk et al. ............ 55/257.3 |

OTHER PUBLICATIONS

"Ocean Technologies ANS Opportunities In The Pacific For The 90's" Oceans Oct. 1–3, 1991 Honolulu, Hawaii USA vol. 1 IEEE.

"Production Of Desalinated Water Using Ocean Thermal Energy" T. Rabas, et al. IEEE 1991.

*Primary Examiner*—Virginia Manoharan

[57] ABSTRACT

An improved ocean thermal energy conversion (OTEC) system which includes a novel combined evaporator/condenser. The combined evaporator/condenser further includes a plurality of evaporator spouts and a mist eliminator, wherein the pressure is maintained across the plurality of evaporator spouts. The OTEC system also generates fresh water as a primary product and generates only enough electricity, as a secondary product, to operate the OTEC system itself.

21 Claims, 14 Drawing Sheets

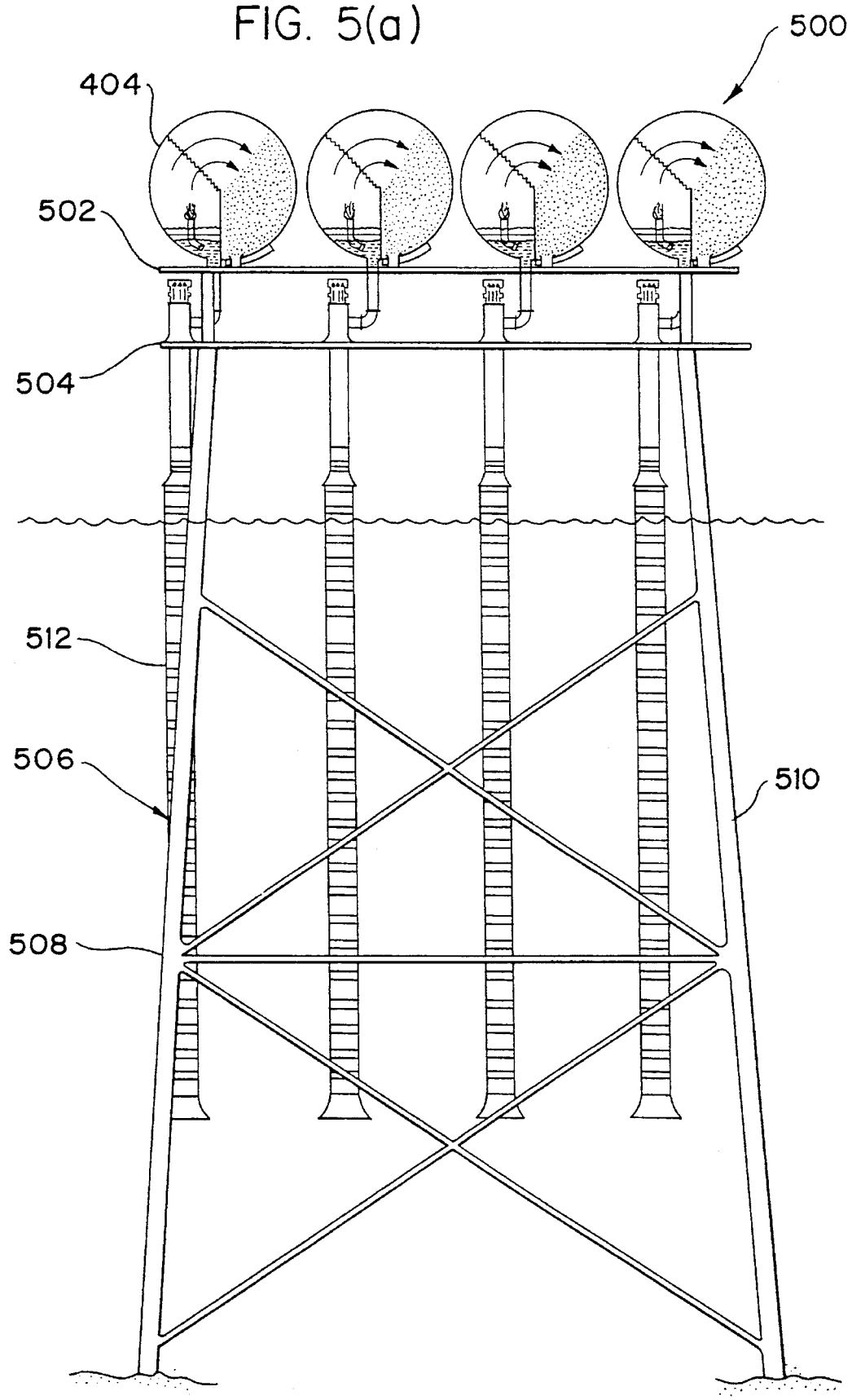

STEAM / MIST FLOW

OCEAN THERMAL ENERGY CONVERSION (OTEC) SYSTEM

The present invention relates to an improved ocean thermal energy conversion (OTEC) system.

BACKGROUND OF THE INVENTION

Conventional ocean thermal energy conversion (OTEC) systems generally fall into three categories; first, a closed-cycle OTEC system 100 for generating electricity as illustrated in FIG. 1; second, an open-cycle OTEC system 200 for generating electricity as a primary product and fresh water as a secondary product as illustrated in FIG. 2; and third, a hybrid-cycle OTEC system 300 for generating electricity as a primary product and desalinated water as a secondary product, illustrated in FIG. 3. Each of these conventional OTEC systems will be discussed below in detail.

As illustrated in FIG. 1, a working fluid, which is contained within the closed cycle, is pumped by a liquid pump 102 into evaporator 104, where heat from a warm water intake is transferred from the warm water to the working fluid to generate a working fluid vapor. The warm water exiting the evaporator 104 is discharged to the sea. The working fluid vapor enters a turbogenerator 106 in order to generate electricity by conventional techniques. The working fluid vapor exits the turbogenerator 106 and is condensed in condenser 108 utilizing cold sea water as a heat sink. The condensed working fluid is then fed back to the feed pump in order to complete the closed cycle.

The open-cycle OTEC system 200 illustrated in FIG. 2 includes a flash evaporator 202 for receiving a warm sea water intake and outputting steam. Further, a pump 204 pumps a warm sea water discharge out of the flash evaporator 202. The steam output from the flash evaporator 202 is input to turbine 206 which is connected to generator 208 in order to generate electricity by conventional techniques. Steam exits the turbine 206 and is input to condenser 210. The conventional open-cycle OTEC system 200 utilizes a surface condenser and a direct contact condenser. A surface condenser keeps the two fluids (sea water and pure water) separate while a direct contact condenser does not. A majority of the steam exiting the turbine 206 is provided to a direct contact condenser in the conventional open-cycle OTEC system 200, in order to generate electricity. The conventional open-cycle OTEC system 200 utilizes a surface condenser to condense a small percentage of the steam generated by the turbine 206 into fresh water utilizing cold sea water as a heat sink. A cold sea water discharge is pumped out of the condenser 210 by a pump 212. The non-condensible exhaust system 212, removes non-condensible gases and a portion of the steam from the steam output from the turbine 206. In the open- cycle OTEC system 200 described above, the generation of electricity by the turbine 206 and generator 208 is the primary product and the fresh desalinated water output from the condenser 210 is the secondary product.

The hybrid-cycle OTEC system 300 illustrated in FIG. 3 includes an evaporator system 302 into which warm sea water is input, of which a small fraction, vaporizes in a vacuum flash evaporator 304. The vapor condenses on an ammonia evaporator 306, which contains ammonia liquid, pumped from pump 308. The vapor from the flash evaporation system 302 condenses on the ammonia evaporator 306, producing desalinated water. The ammonia vapor is input to an ammonia turbine/generator 310 in order to generate electricity by conventional techniques. The ammonia vapor is then condensed in an ammonia condenser 312. The recondensed ammonia is recycled to the pump 308 to complete the closed portion of the hybrid-cycle OTEC system 300.

Both the closed cycle and open cycle OTEC systems discussed above utilize separate evaporators and condensers. Further the hybrid cycle OTEC system discussed above utilizes a conventional evaporator system 302. The improved OTEC system of the present application includes a novel combined evaporator/condenser in contrast to the three above-identified systems. The combined evaporator/condenser further includes a plurality of evaporator spouts and a mist eliminator. The OTEC system of the present application further maintains a constant low pressure over each of the plurality of evaporator spouts. The OTEC system of the present application also generates fresh water as a primary product. The OTEC system of the present application generates only enough electricity, as a secondary product, to operate the OTEC system itself.

SUMMARY OF THE INVENTION

One object of the present invention is to provide an improved ocean thermal energy conversion (OTEC) system.

It is a further object of the present invention to provide a novel combined evaporator/condenser.

It is a further object of the present invention to provide the combined evaporator/condenser with a plurality of novel evaporator spouts.

It is a further object of the present invention to provide the combined evaporator/condenser which maintains a constant low pressure over each of the plurality of evaporator spouts.

It is a further object of the present invention to provide the combined evaporator/condenser which maintains a constant low pressure over each of the plurality of evaporator spouts by providing a reservoir which feeds the combined evaporator/condenser.

It is a further object of the present invention to provide the combined evaporator/condenser with a novel mist eliminator.

It is a further object of the present invention to provide an OTEC system for producing fresh desalinated water as a primary product.

It is a further object of the present invention to provide an OTEC system for providing just enough electricity, as a secondary product, to operate the OTEC system.

It is a further object of the present invention to provide an OTEC system which utilizes the legs of the platform for support and as a conduit for warm and cold intake water.

It is a further object of the present invention to provide an OTEC system which includes an energy recovery turbine in the warm and cold water discharge pipes.

It is a further object of the present invention to provide an OTEC system wherein the energy recovery turbines are coupled either to electric generators or directly shafted to intake pumps.

It is a further object of the present invention to provide an OTEC system wherein the condenser steam flow path has a decreasing cross-sectional area.

It is a further object of the present invention to provide an OTEC system wherein the warm sea water pumping system provides for precise control of pressure in the flash evaporator via a plurality of interconnected pumps and a vertical static head pressure regulation system.

It is a further object of the present invention to provide an OTEC system which provides a predeaeration chamber for the removal of non-condensible gases.

It is a further object of the present invention to provide an OTEC system which provides a choke segment-in the warm sea water inlet to precipitate the evolution of non-condensible gases.

It is a further object of the present invention to provide an OTEC system which provides a seed bubble injector system, either fed by the warm sea water intake or warm sea water discharge, wherein the seed bubbles act as a catalyst for the additional evolution of non-condensible gas in the predeaeration chamber.

These objects of the present invention are fulfilled by providing an improved ocean thermal energy conversion (OTEC) system comprising:

desalination means for receiving warm sea water, flash evaporating a portion of the warm sea water to produce steam, and condensing the steam with cold sea water to produce fresh water; and energy generation means for receiving the warm sea water, evaporating a working fluid to produce a working vapor, generating energy from the working vapor, and condensing the working vapor with the cold sea water.

These objects of the present invention are further fulfilled by providing an evaporator/condenser, comprising:

flash evaporation means for receiving warm sea water and flash evaporating a portion of the warm sea water to produce steam, a mist eliminator for removing mist from the steam, and condenser means for condensing the steam with cold sea water to produce fresh water.

These objects of the present invention are further fulfilled by providing a method of generating fresh water, comprising the steps of:

(a) receiving warm sea water and flash evaporating a portion of the warm sea water to produce steam;

(b) condensing the steam with cold sea water to produce fresh water;

(c) receiving the warm sea water and evaporating a working fluid to produce a working vapor; and (d) generating energy from the working vapor and condensing the working vapor with the cold sea water.

These and other objects of the present invention will become more readily apparent from the detailed description given hereafter. However, it should be understood that a detailed description and specific Examples, while indicating preferred embodiments of the invention, are given by way of illustration only, since various changes and modifications within the spirit and scope of the invention will become apparent to those skilled in the art from this description.

BRIEF DESCRIPTION OF THE DRAWINGS

The present invention will become more fully understood from the detailed description given hereinbelow and the accompanying drawings which are given by way of illustration only and thus are not limitative of the present invention and wherein:

FIG. 5(a) illustrates the platform which supports the improved OTEC system illustrated in FIGS. 4(a) and 4(b);

DETAILED DESCRIPTION OF THE PREFERRED EMBODIMENT

Figure 1:
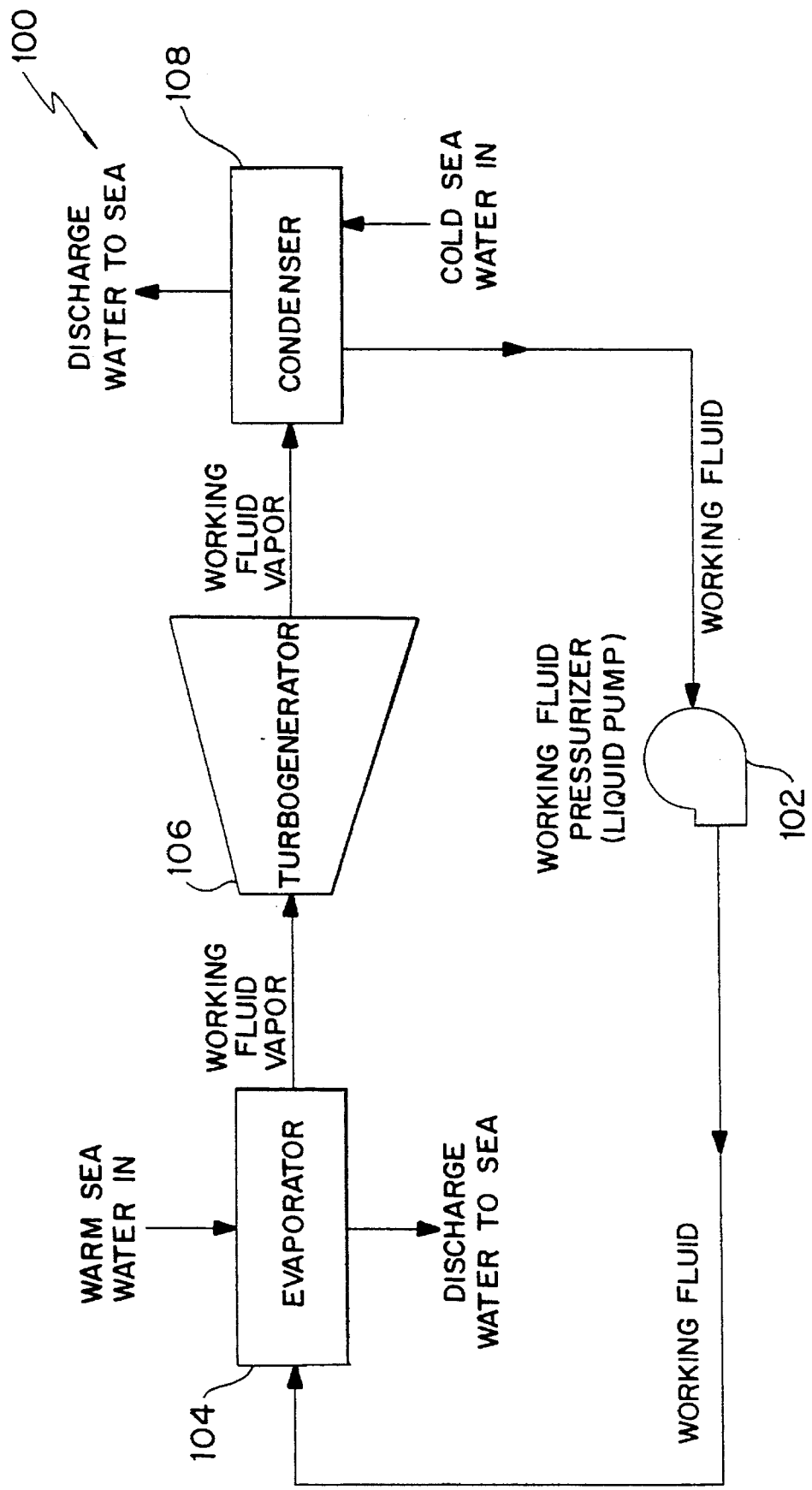
FIG. 1 illustrates a conventional closed-cycle OTEC system.
Figure 2:
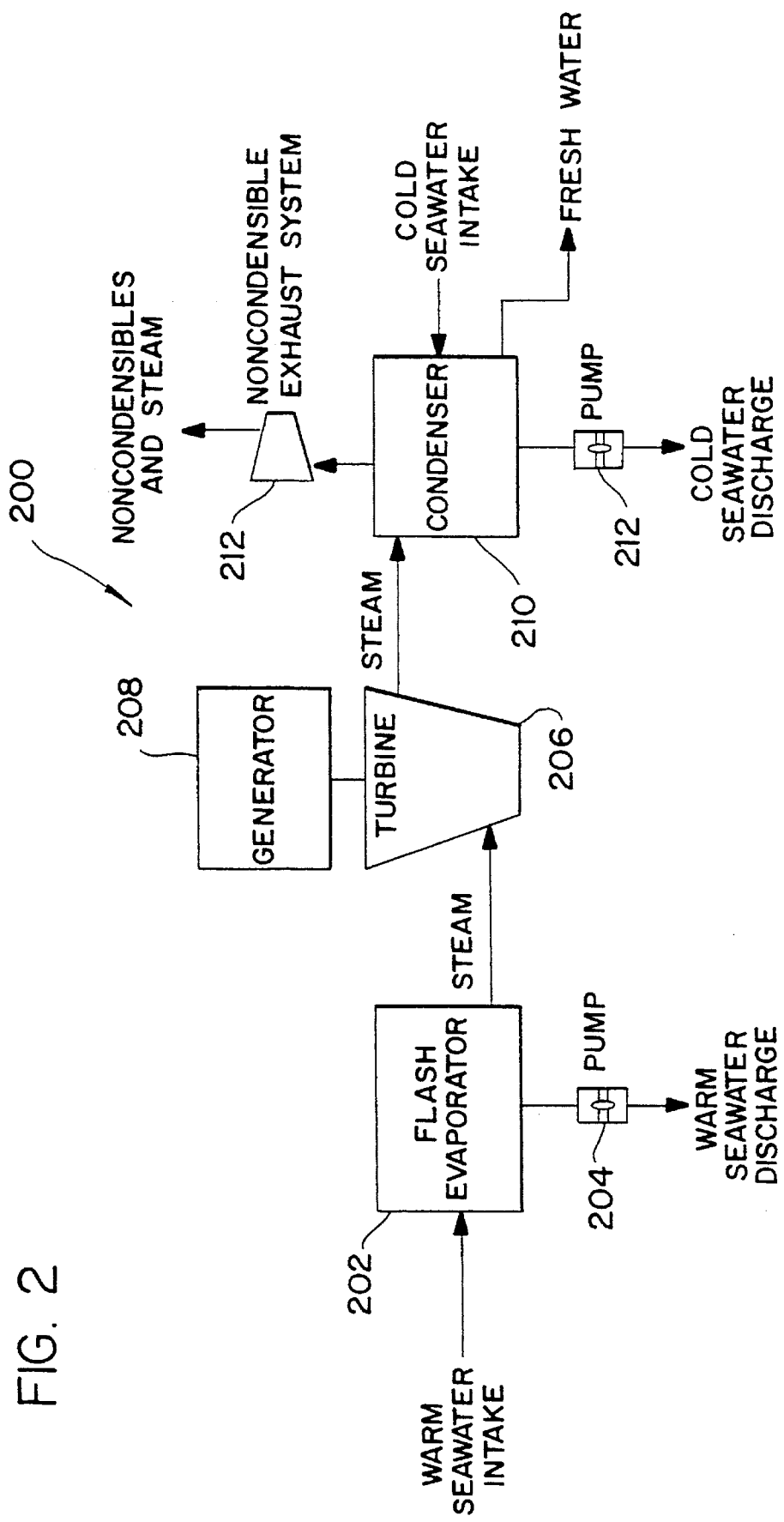
FIG. 2 illustrates a conventional open-cycle OTEC system.
Figure 3:
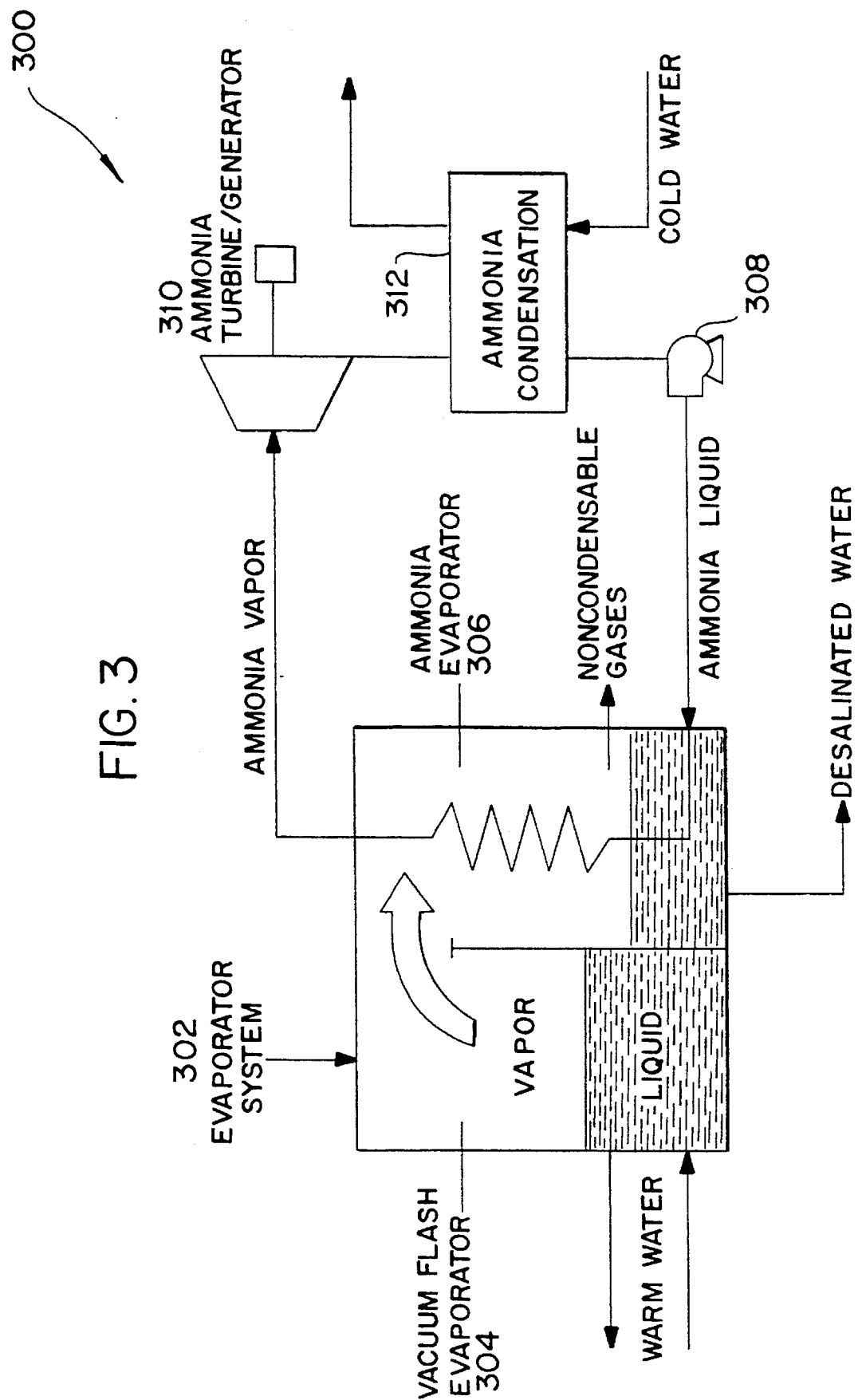
FIG. 3 illustrates a conventional hybrid-cycle OTEC system.
Figure 4A:
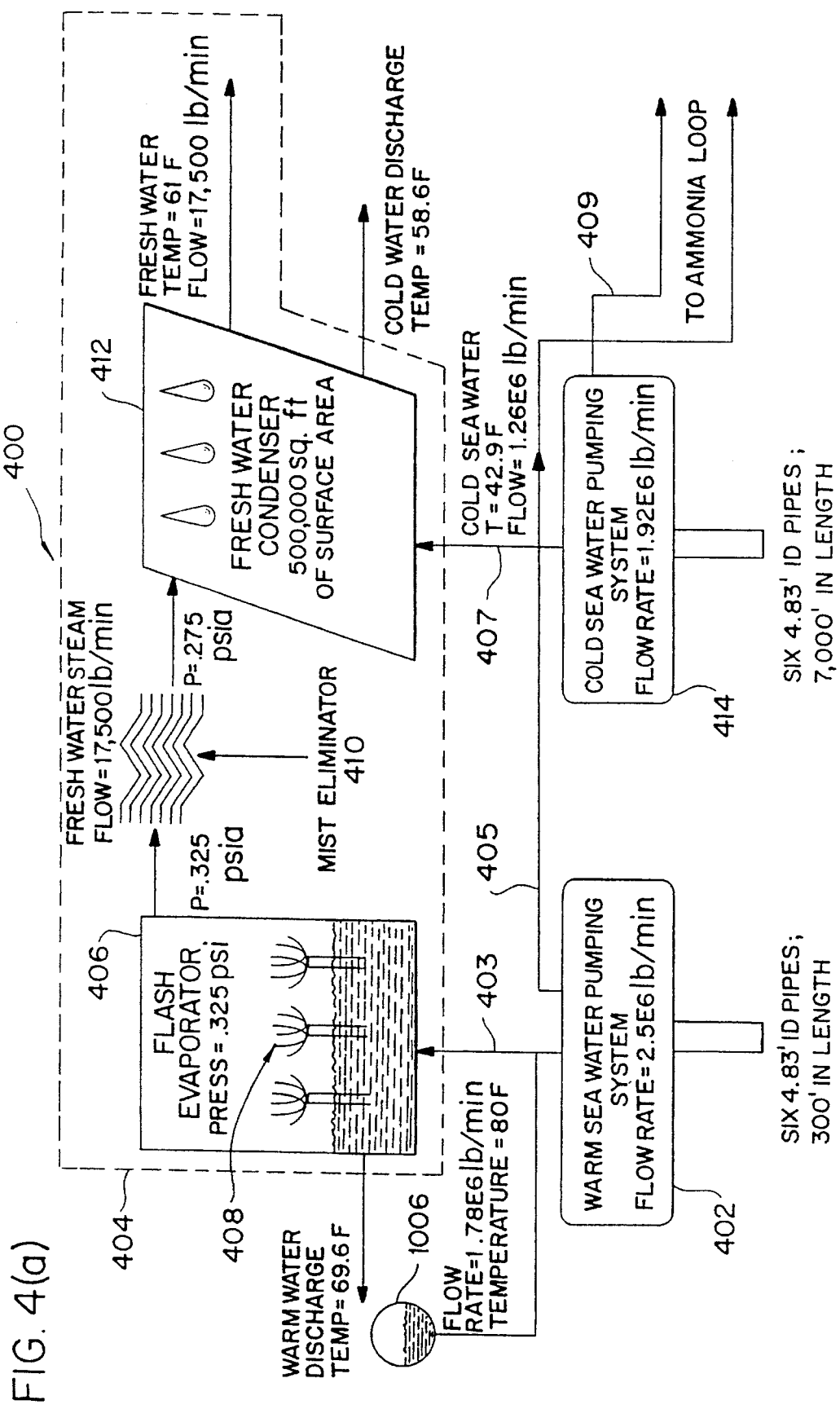
FIGS. 4(a) and 4(b) illustrate the improved OTEC system of the present invention, in a preferred embodiment.
Figure 4B:
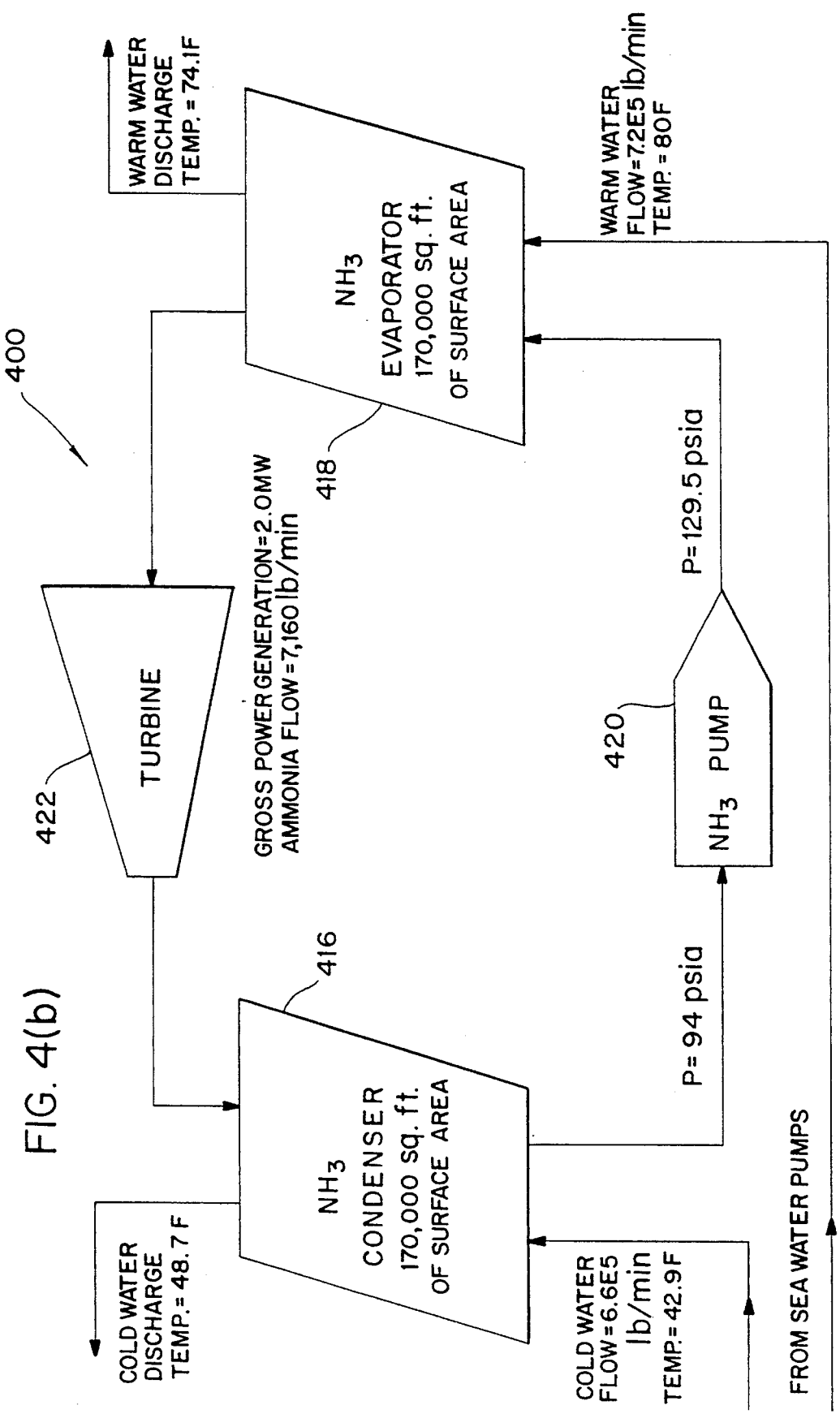

The improved ocean thermal energy conversion (OTEC) system 400 of the present invention, in a preferred embodiment, is illustrated in FIGS. 4(a) and 4(b). This OTEC system 400 generates three million gallons of water per day and 2.0 megawatts of gross electricity. These 2.0 megawatts of electricity are utilized to power the OTEC system 400 illustrated in FIGS. 4(a) and 4(b), and as a result, the net electricity generated by the OTEC system 400 of the present application is zero megawatts. The various components of the OTEC system of the present application are sized such that the number of gallons of fresh water is maximized and the amount of electricity generated is sufficient enough to power the OTEC system 400.

As illustrated in FIGS. 4(a) and 4(b), the OTEC system 400 of the present application comprises warm sea water pumping system 402 for pumping 2,500,000 pounds of warm sea water per minute. The warm sea water pumping system 402 is fed by six 4.83 foot ID pipes, which are each 300 feet in length. The 80° F. warm sea water exiting the warm sea water pumping system 402 is split into two warm sea water streams 403 and 405. 1,780,000 pounds per minute (warm sea water stream 403) flows to flash evaporator. 406 and 720,000 pounds per minute (warm sea water stream 405) flows to ammonia evaporator 412. The warm sea water enters evaporator/condenser 404 at flash evaporator 406 which is maintained at a pressure of 3.325 psi. The warm sea water is flash evaporated through several flash evaporator spouts 408. A warm water discharge at a temperature of 69.6° F. and steam at a pressure of less than or equal to 3.325 psi. exit the flash evaporator 406. This warm water discharge is non mixed with warm sea water stream 405, input to NH$_3$ evaporator 418. The steam is input to a mist eliminator 410 at a rate of 17,500 pounds per minute and the steam exiting from the mist eliminator 410 exits at a pressure of greater than or equal to 0.275 psia. This steam is input to a fresh water condenser 412 having 500,000 sq. ft. of surface area.

Entering tubes of the fresh water condenser 412 is cold sea water (cold sea water stream 405) at a rate of 1,260,000 pounds per minute at a temperature of 42.9° F. This cold sea water is provided by cold sea water pumping system 414 which receives 1,920,000 pounds of cold sea water per minute via six 4.83 foot ID pipes, each of which are 7,000 feet in length. The fresh water condenser 412 generates fresh desalinated water at a rate of 17,500 pounds per minute at a temperature of 61° F. and a cold sea water discharge flow at a temperature of 58.6° F. This cold sea water discharge is not mixed with cold sea water stream 409, input to $NH_3$ condenser 416. The fresh water exiting the fresh water condenser 412 is the primary product of the improved OTEC system 400 of the present application.

As discussed above, FIG. 4(a) illustrates each of the elements necessary to generate fresh desalinated water from the OTEC system 400 of the present application. In contrast, FIG. 4(b) of the present application illustrates the components necessary to generate sufficient electricity to power the OTEC system 400.

The warm sea water pumping system takes in 2,500,000 pounds of warm sea water per minute and outputs 1,780,000 pounds of warm sea water per minute to the flash evaporator 406 (warm sea water stream 403). The remaining 720,000 pounds of warm sea water per minute at a temperature of 80° F. (warm sea water stream 405) is input to an ammonia evaporator 418.

Similarly, the cold sea water pumping system 414 receives cold sea water at a rate of 1,920,000 pounds per minute and outputs 1,260,000 pounds of cold sea water per minute to the fresh water condenser 412 (cold sea water stream 407).

The remaining 660,000 pounds of cold sea water at a temperature of 42.9° F. (cold sea water stream 409) is input to an ammonia condenser 416. The warm sea water (warm sea water stream 405) from the warm sea water pumping system 402 is input to the ammonia evaporator 418, which has 170,000 sq. ft. of surface area.

The warm sea water (warm sea water stream 405) heats liquid ammonia pumped by an ammonia pump 420 at a pressure of 129.5 psia to produce ammonia vapor and a warm water discharge at a temperature of 74.1° C. The ammonia vapor is input to a turbine 422 at a rate of 7,160 pounds of ammonia vapor per minute in order to produce a gross power generation of 2.0 megawatts. The ammonia vapor exiting the turbine 422 is input to the ammonia condenser 414, which also has 170,000 sq. ft. of surface area The cold sea water (cold sea water stream 409) from the cold sea water pumping system 414 is also input to the ammonia condenser 414, which outputs a cold water discharge at a temperature of 48.7° F. and liquid ammonia at a pressure of 94 psia. This ammonia is recycled back to the ammonia pump 420 in order to complete the closed cycle ammonia path.

The OTEC system 400 described in FIGS. 4(a) and 4(b) is supported by the platform 500, illustrated in FIG. 5(a). The platform 500 includes two decks 502 and 504, and further includes a jacket 506 which includes all of the structure below the deck 504. The jacket 506 extends approximately 30 feet above the water surface. The jacket 506 has six legs, two of which are shown in FIG. 5(a) as legs 508 and 510. The legs, which may house the 4.83 foot ID pipes, which provide the cold sea water pumping system 414 with cold sea water from a depth of 2700 feet. FIG. 5(a) further illustrates four evaporator/condensers 400, although this number may vary depending on the desired amount of fresh water. Warm sea water intake pipes 512 extend down less than 100 feet and feed the four evaporator/condensers 404.

Figure 5B:
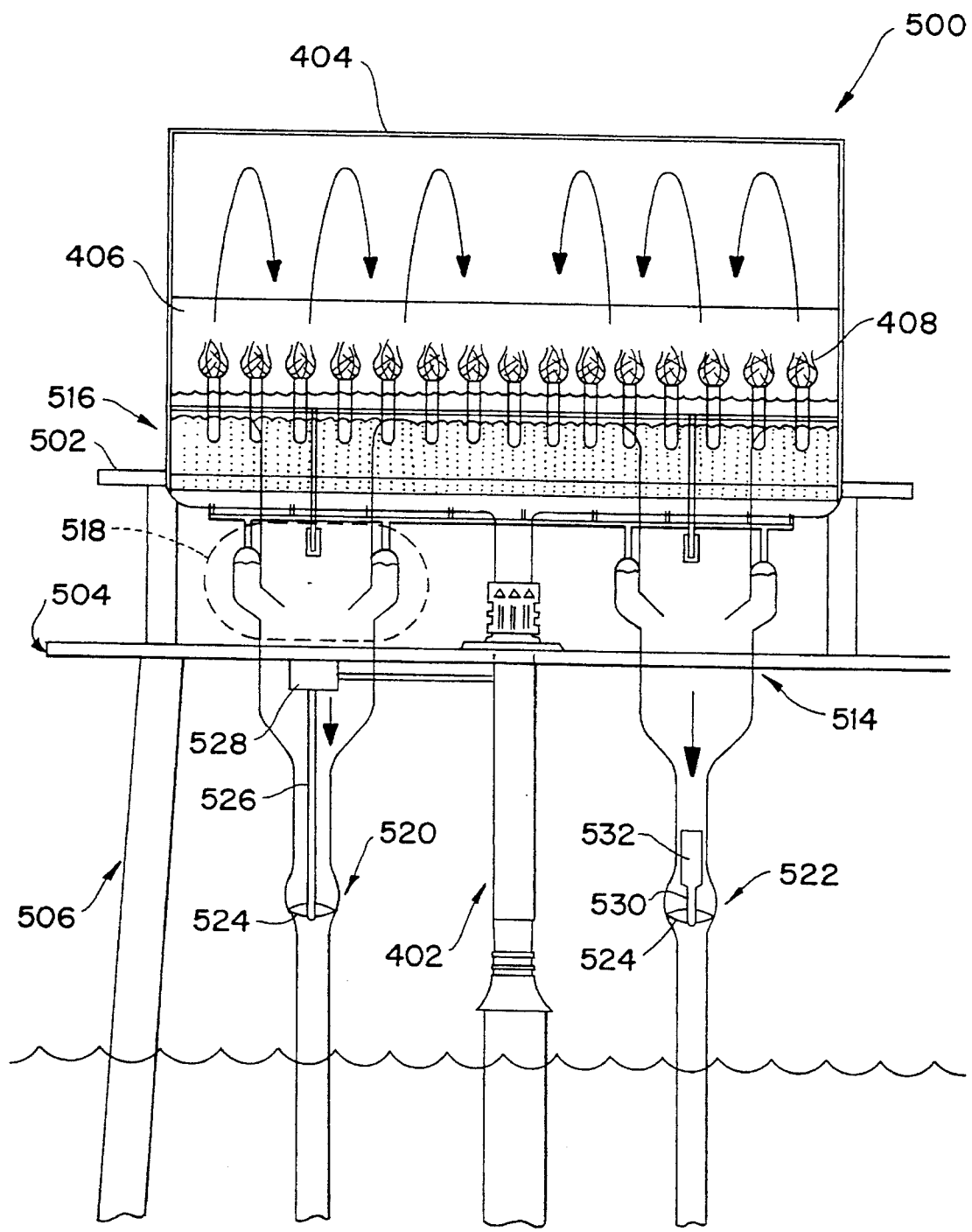
FIG. 5(b) illustrates the platform and the evaporator/condenser from an evaporator perspective.

FIG. 5(b) illustrates the platform 500, the warm sea water pumping system 402, an evaporator/condenser 404 (from an evaporator perspective), a warm sea water discharge system 514, and a non-condensible removal system 516. As illustrated in FIG. 5(b), each flash evaporator 406 includes fifteen flash evaporator spouts 408.

FIG. 5(b) further illustrates a seed bubble generation system 518. FIG. 5(b) further illustrates two alternative energy recovery turbines 520 and 522, each of which include a turbine blade system 524 for the extraction of power from the discharged warm sea water. In the energy recovery turbine 520, the warm water discharge turns a turbine shaft 526 and the shaft 526 turns a right angle gear box 528, which is connected to a pump of the warm sea water pumping system 402, thereby providing auxiliary power to the pump. In the energy recovery turbine 522, the warm water discharge turns a turbine shaft 530, which is connected to a generator 532. The electricity produced by the generator 532 is used as needed anywhere in the OTEC system 400 to reduce the energy consumption.

Figure 5C:
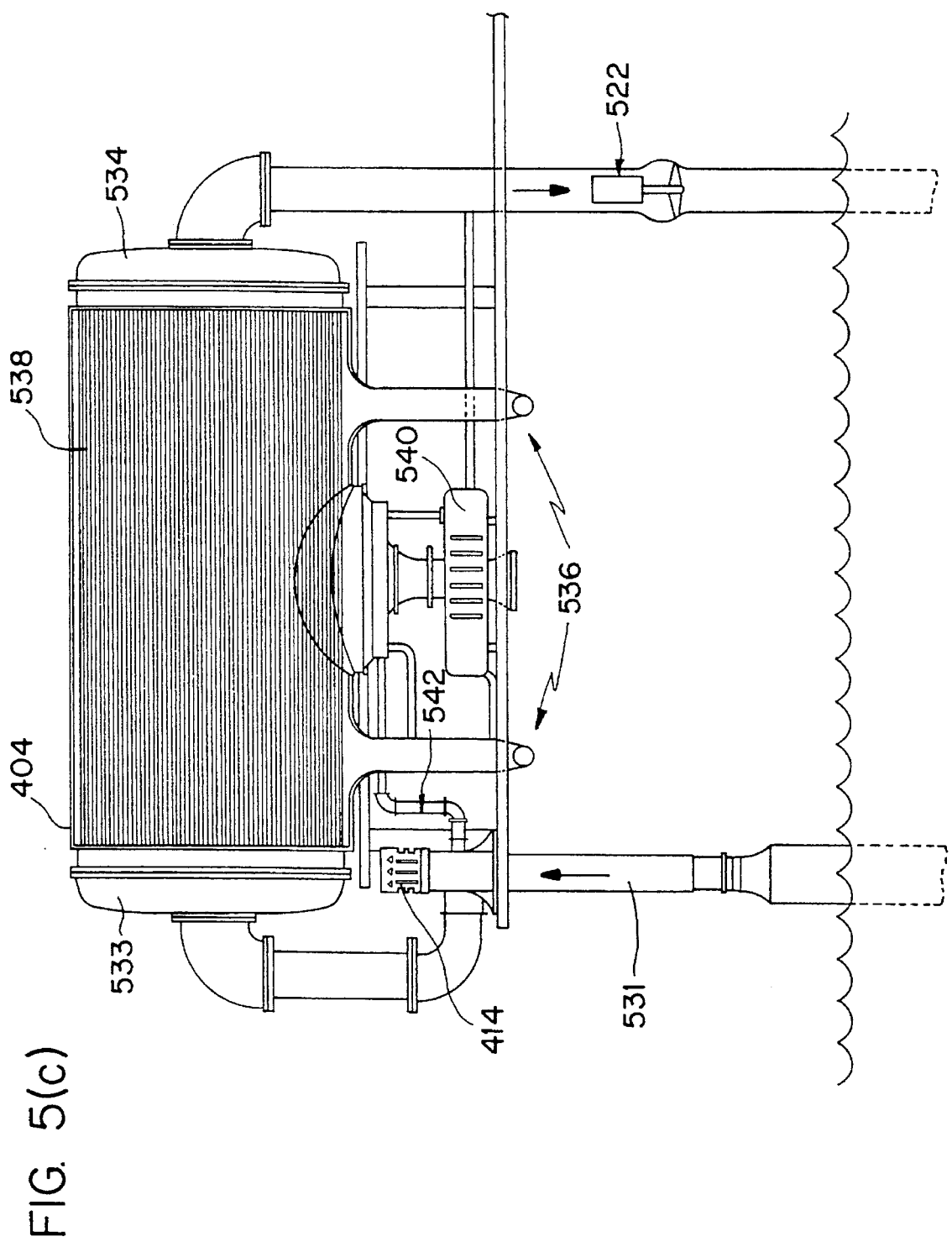
FIG. 5(c) illustrates the platform and the evaporator/condenser from a condenser perspective.

FIG. 5(c) illustrates the evaporator/condenser 404 from a condenser perspective and the cold sea water pumping system 414. The cold sea water enters a pump 531 of the cold sea water pumping system 414. The cold sea water is then pumped to an inlet manifold 533 which distributes the cold sea water through a plurality of condenser tubes 538 of the fresh water condenser 412. The cold sea water exits the fresh water condenser 412 through an exit manifold 534 and a cold sea water discharge pipe. An energy recovery turbine 522 is located in the cold water discharge and performs the same function as the energy recovery turbine 522 of FIG. 5(b). Steam condenses on an exterior of the plurality of condenser tubes 538. The condensed steam is routed into funnel-shaped collection ports 536, which is then pumped to shore. Non-condensible gases and a portion of uncondensed steam are input to vacuum system 540, which compresses the mixture to condense the previously uncondensed steam and expel the non-condensible gases to the atmosphere or to the warm or cold water discharges. A portion of the cold sea water is input to the vacuum system 540 via pipe 542 to help cool this process.

Figure 6A:
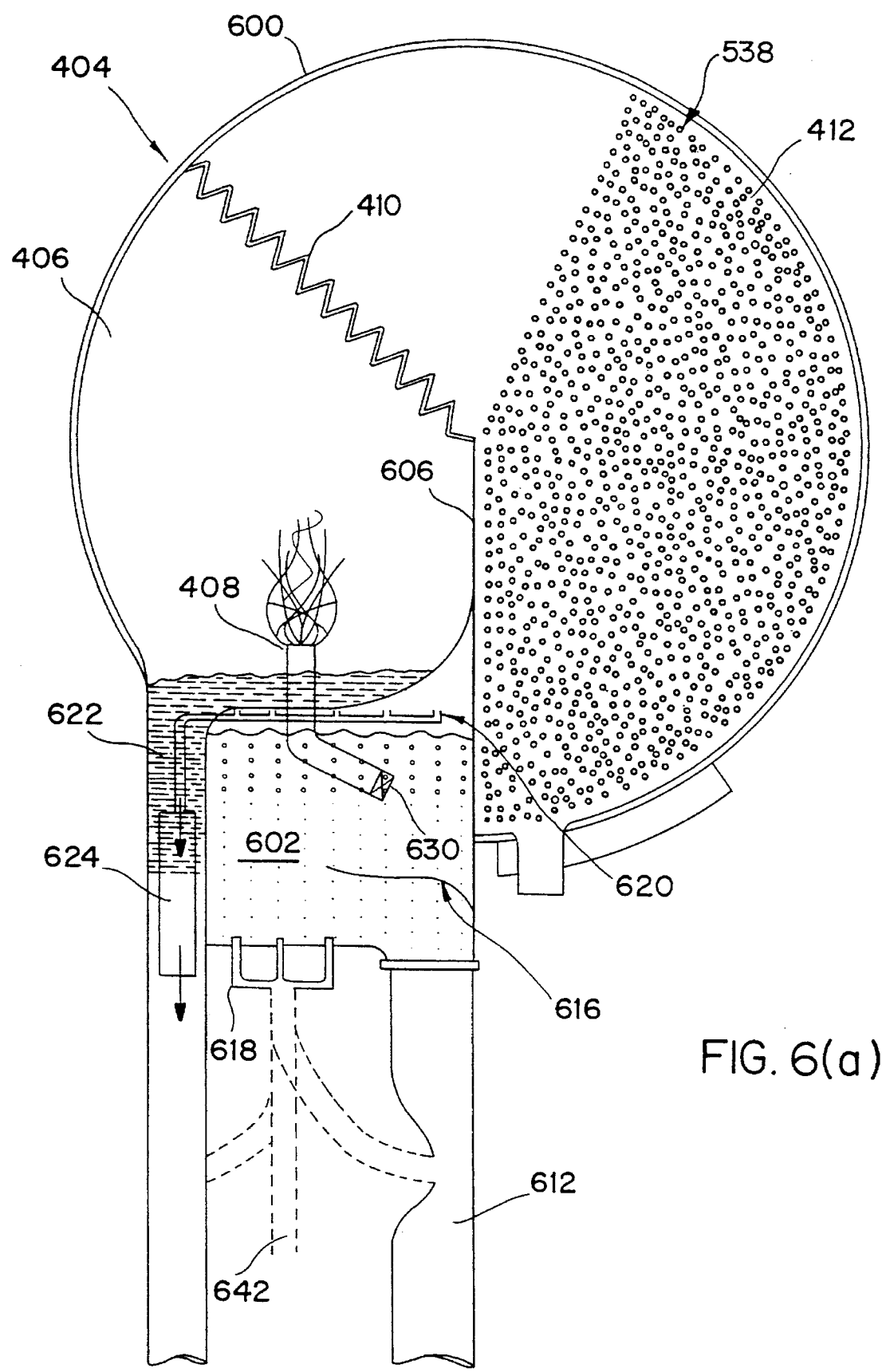
FIGS. 6(a) illustrates one embodiment of the novel combined evaporator/condenser for the OTEC system illustrated in FIGS. 4(a) and 4(b)

The evaporator/condenser 404, illustrated in FIG. 4(a), will now be described in further detail, as illustrated in FIGS. 6(a). The flash evaporator 406, the mist eliminator 410, the fresh water condenser 412, and a predeaeration chamber 602 are housed within evaporator/condenser shell 600. The warm sea water from warm sea water pumping system 402 is input to the predeaeration chamber 602. Within the predeaeration chamber 602, non-condensible gases are separated from the warm sea water and the non-condensible gases are either returned in the warm water discharge pipe 622 or returned to the ocean or the atmosphere by the vacuum system 540.

The warm sea water passes from the predeaeration chamber 602 to the flash evaporator 406 via a flash evaporator spout 408 thereby producing water vapor and mist within the flash evaporator 406. Flow control valve 710 controls the flow of warm sea water into the flash evaporator 406. The mist eliminator 410 is physically attached to the evaporator/condenser shell 600 and a separation wall 606, and separates the flash evaporator 406 from the fresh water condenser 412.

The mist eliminator 410 traps mist on the flash evaporator side and only allows water vapor to pass through such that the water vapor may be condensed in fresh water condenser 412. The fresh water condenser 412 includes the plurality of condenser tubes 538 and the condensed water vapor is collected at a rate of 17,500 pounds per minute, as discussed above with respect to FIG. 4(a).

In an effort to reduce the quantity of non-condensible gases revode by the vacuum system 540, a predeaeration chamber 602 is employed. Seed bubbles provide a catalyst for the further evolution of non-condensible gases in the predeaeration chamber 602. These seed bubbles may be collected from the warm sea water intake, the warm sea water discharge, or from the atmosphere. These three alternatives are illustrated in FIG. 6(a).

In order to collect the seed bubbles from the warm sea water intake, the warm sea water passes through a choke segment 612 and then enters the predeaeration chamber 602. At the choke segment 612, the pressure is decreased due to the restriction in diameter and the seed bubbles of the non-condensible gases are generated. In addition to the production of seed bubbles, the choke segment 612 provides for a greater evolution of non-condensible by creating a low pressure point in the warm sea water intake flow.

The seed bubbles can also be supplied by providing a pipe with a check valve 642 to the atmosphere.

Figure 6C:
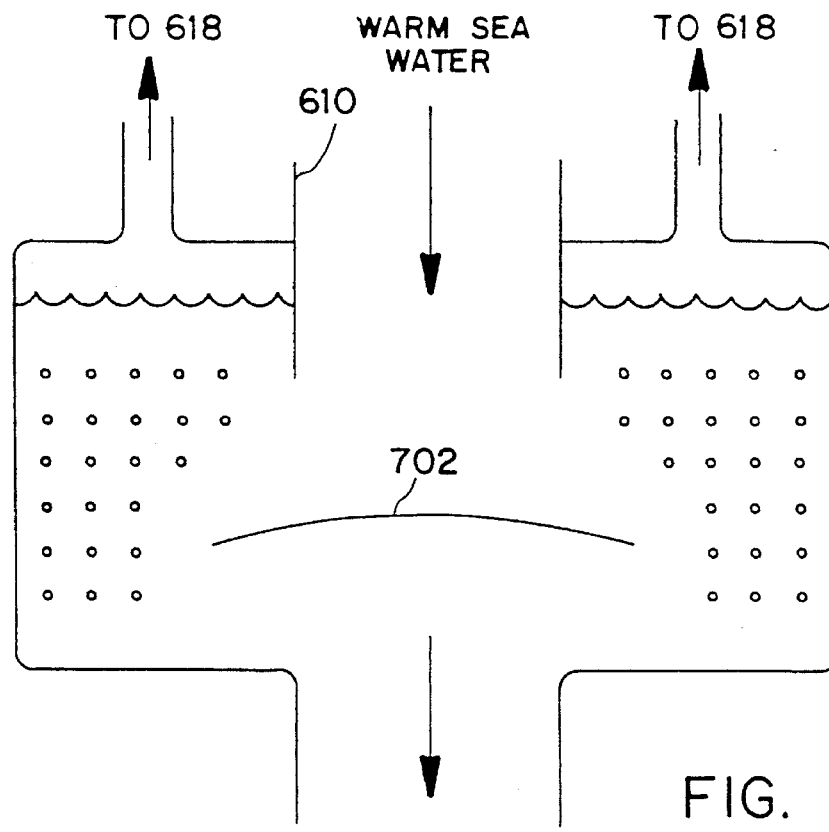
FIGS. 6(b) through 6(d) illustrate three alternatives for collecting seed bubbles for evolving non-condensible gases.
Figure 6B:
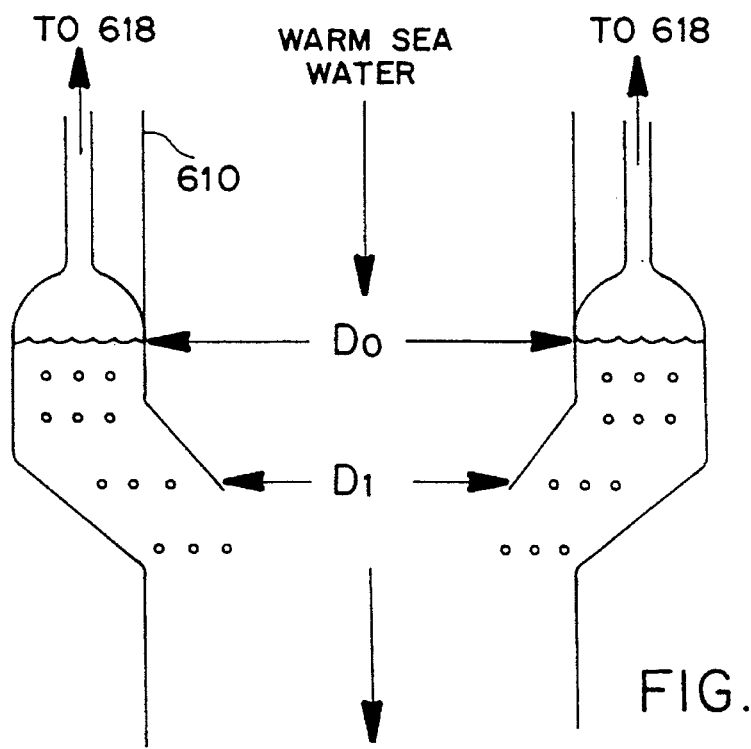
Figure 6D:
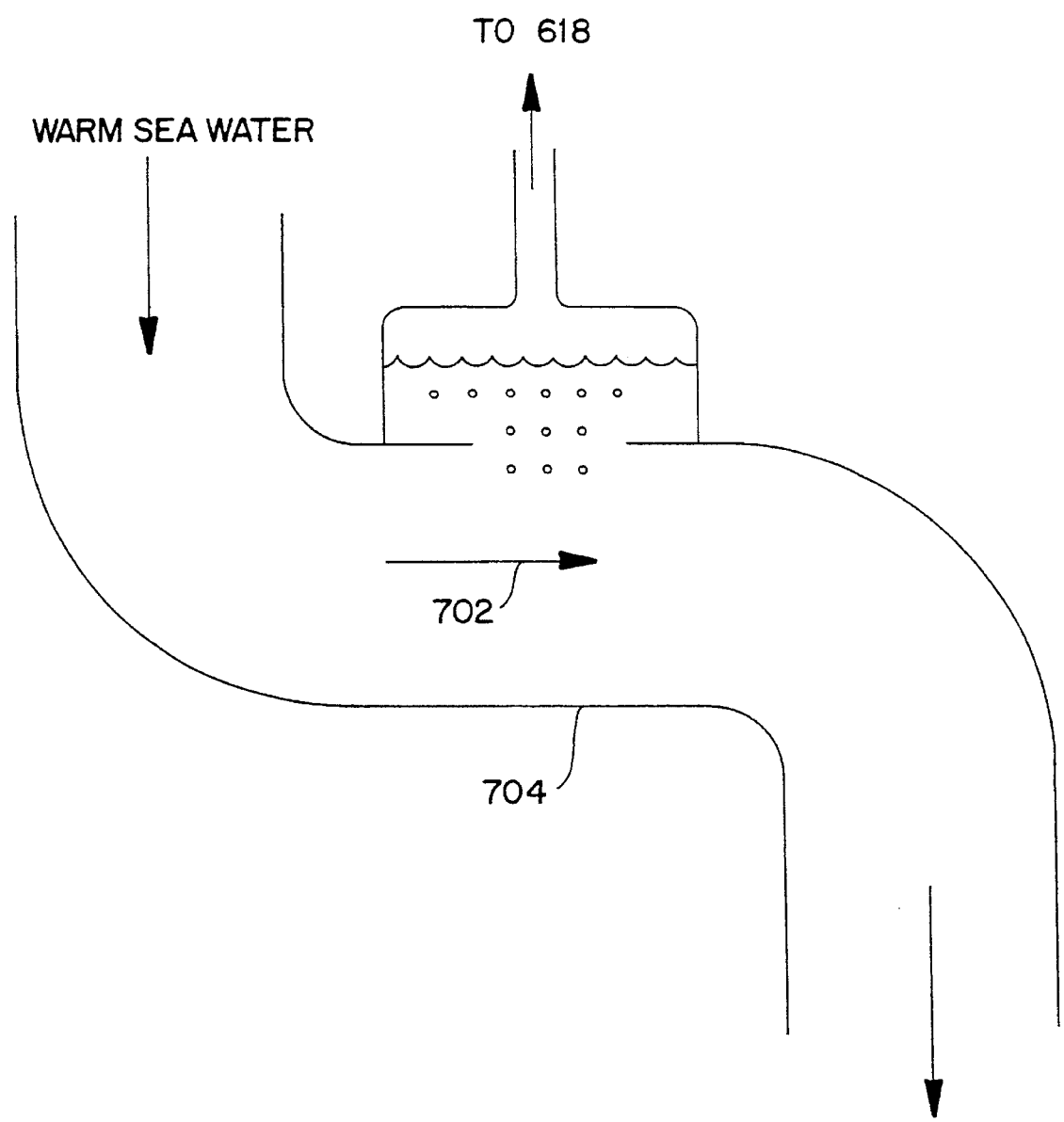

The seed bubbles can also be supplied from the warm sea water discharge using the three techniques illustrated in FIGS. 6(b)–(d). In FIG. 6(b), the diameter of the warm sea water outlet flow pipe 610 is reduced from $D_o$ to $D_1$ to create a stagnant region immediately downstream of D1 to separate the seed bubbles of the non-condensible gases from the warm water discharge. The seed bubbles are carried by the seed bubble pipe 614 and the seed bubble injection system 618 to the predeaeration chamber 602.

In another preferred embodiment as illustrated in FIG. 6(c), a baffle 702 is placed in the warm sea water inlet flow pipe 610 to create a stagnant region due to the obstruction of the baffle 702 and the enlarged diameter of the pipe in this region. The separated seed bubbles of the non-condensible gases are input to predeaeration chamber 602 via the seed bubble pipe 614 and the seed bubble injection system 618.

In another preferred embodiment as illustrated in FIG. 6(d), a region of zero vertical velocity 702 is created by horizontal pipe section 704, wherein the natural buoyancy of non-condensible gases allow separation from the warm sea water discharge to occur, generating seed bubbles, which are collected in region 706. The seed bubbles are then input to the predeaeration chamber 602 via the seed bubble pipe 614 and the seed bubble injection system 618.

The predeaeration chamber 602 functions to remove as much of the non-condensible gases (NGC) from the warm sea water prior to introduction to the flash evaporator 406. The percentage of the non-condensible gases which are removed from the warm sea water is a function of three parameters: the pressure in the predeaeration chamber 602, the length of time the warm sea water spends in the predeaeration chamber 602, and the cross sectional area of the predeaeration chamber 602.

The predeaeration chamber 602 illustrated in FIG. 6(a) further includes baffle 616, which routes the warm sea water in an indirect fashion to the flash evaporator spouts 408. This extends the period of time the warm sea water is in the predeaeration chamber 602. As a result, the warm sea water has a greater residency time in the predeaeration chamber 602 and is more heavily seeded with bubbles, which triggers a higher percentage of non-condensible gases to be evolved and carried away at the top of the predeaeration chamber 602.

The non-condensible gases which have gathered at the top of the predeaeration chamber 602 are then removed by the NCG removal pipes 620. The warm sea water discharge is then utilized to compress the non-condensible gases so that they may be either discharged at atmospheric pressure or reabsorbed into the warm sea water discharge released back into the ocean or atmosphere.

The NCG removal pipes 620 which remove the non-condensible gases from the predeaeration chamber 602 are extended down the warm water discharge pipe 622 with a vertically-movable extension 624 to such a depth that the pressure in the warm water discharge pipe 622 is incrementally less than the desired pressure in the predeaeration chamber 602. In this way, the removed condensible gases will flow from the predeaeration chamber 602 into the warm water discharge pipe 622. This extension 624 can be moved vertically up and down so that this pressure can be regulated. The velocity of the vertical bubble rise in the warm sea water is less than the velocity of the warm sea water discharge in the down pipe 622 so that the bubbles will be forced down with the discharge flow and become compressed as the pressure in the water increases.

Figure 7:
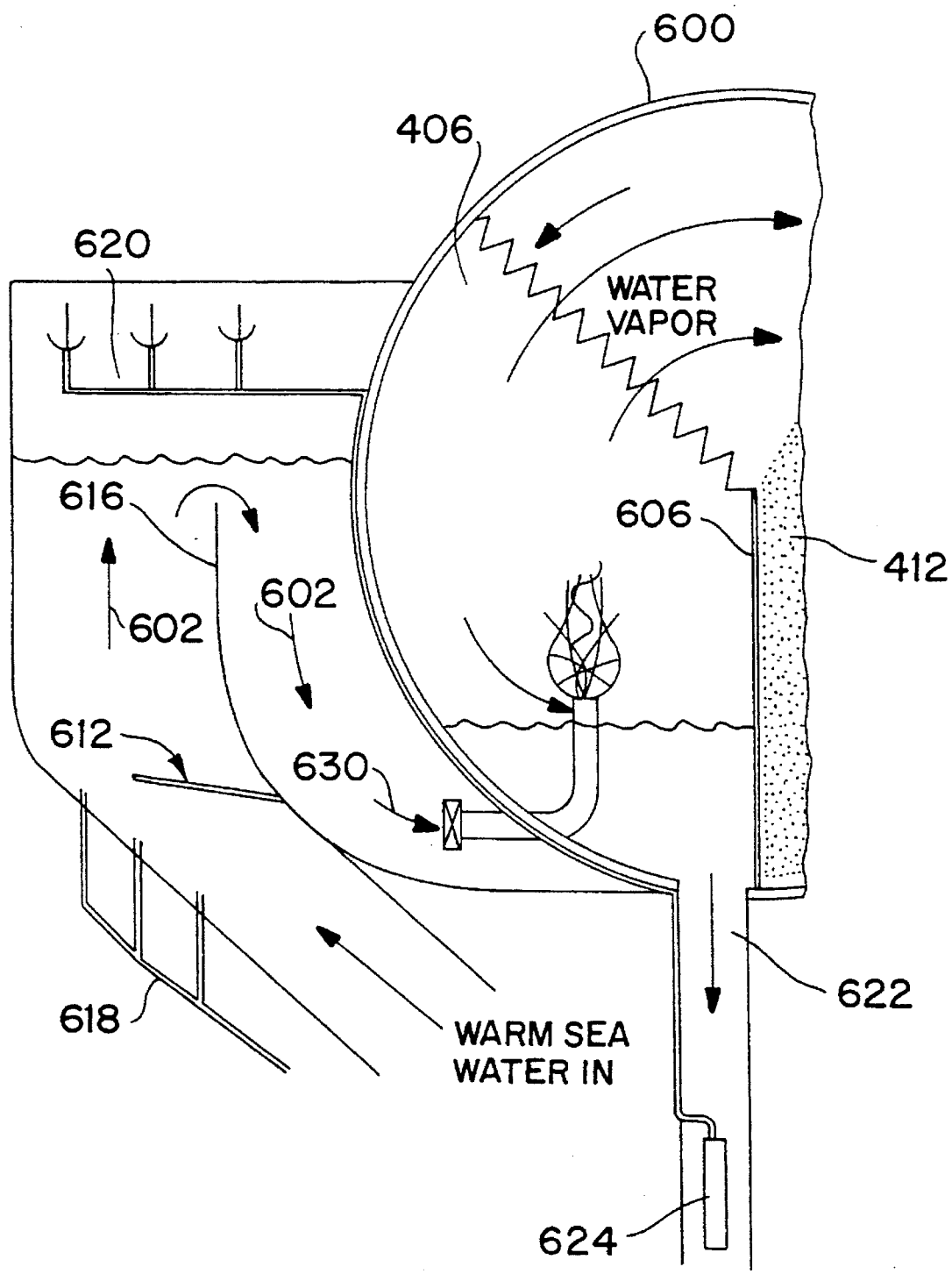
FIGS. 7 illustrates another embodiment of the novel combined evaporator/condenser for the OTEC system illustrated in FIGS. 4(a) and 4(b)

FIG. 7 illustrates an alternative embodiment of the evaporator/condenser 404 of FIG. 6(a). FIG. 7 and FIG. 6(a) include numerous common elements, which have been given the same numerals, and whose description is omitted here. The predeaeration chamber 602 is placed outside the shell 600 and above the evaporation spouts 08. This configuration increases NCG removal because the warm sea water spends more time in the predeaeration chamber 602. The larger volume of the predeaeration chamber 602 and its elevation above the evaporator spouts 408 provides additional control over the pressure inside the flash evaporator 406.

In order for the OTEC system of the present application to continuously produce fresh water from fresh water condenser 412, it is important that the pressure within the flash evaporator 406 be controlled near 0.3 psia. Since the flash evaporator 406 includes multiple flash evaporator spouts 408, it also is necessary to maintain a constant pressure at each of the flash evaporator spouts 408. If the pressure in the flash evaporator 406 is too far above 0.3 psia, then not enough steam will be generated. If the pressure is too far below 0.3, the steam can not reach the last condenser tube 412 and the steam begins to accumulate and cause the removal of the non-condensible gases to cease. The OTEC system of the present application typically operates with a pressure of 0.3 psia ±0.05.

Figure 8:
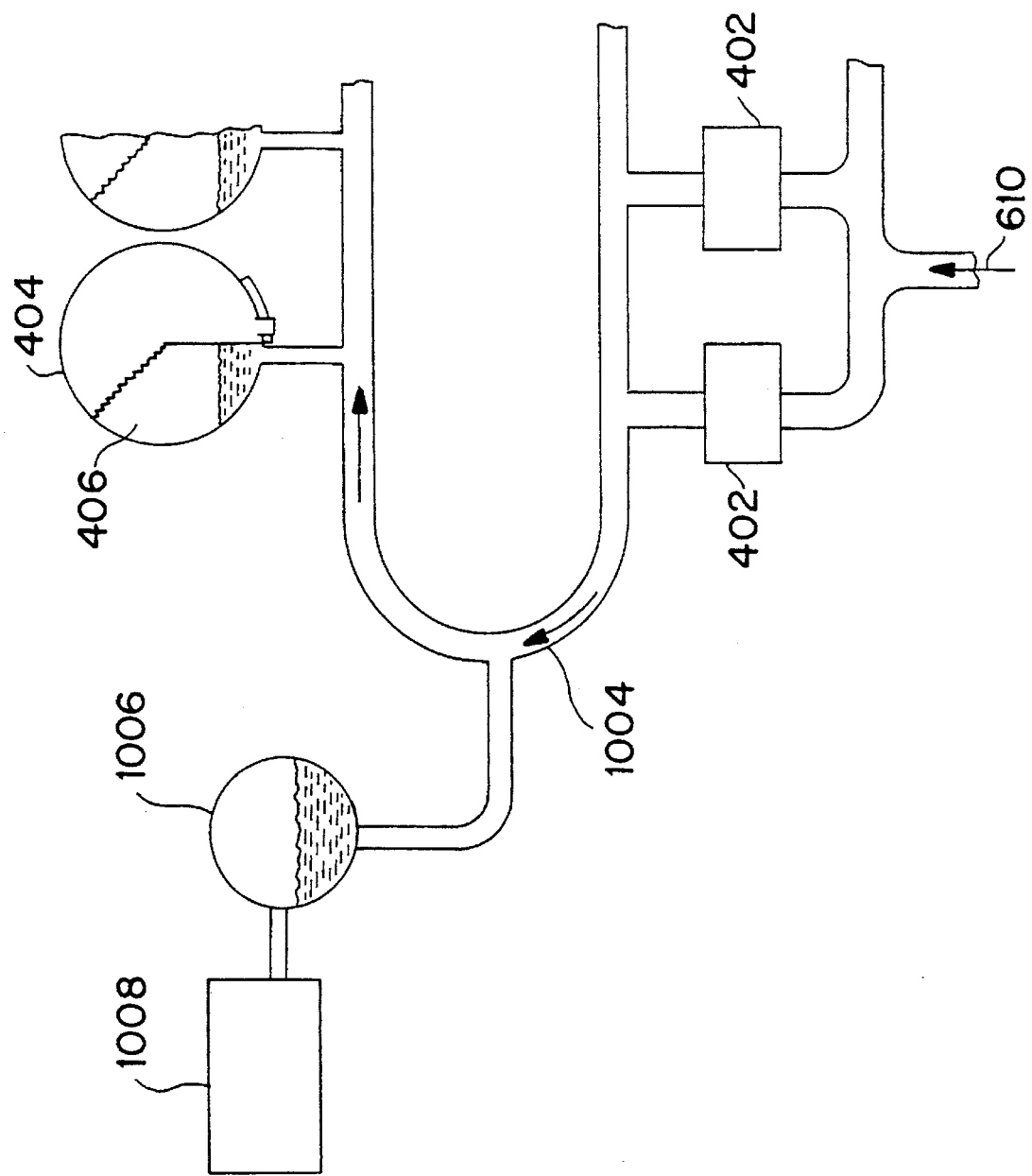
FIGS. 8 illustrates a reservoir system for use in the OTEC system illustrated in FIGS. 4(a) and 4(b)

The evaporator/condenser 404 of the present application requires relatively steady flow rates and pressures. In order to maintain control over the pressure within the flash evaporator 406 and across each of the flash evaporator spouts 408, a configuration such as the one illustrated in FIG. 8 is utilized. The warm sea water inlet pipe 610 carries warm sea water into pumps 402. Were pumps 402 directly connected to each of the flash evaporators 404, voltage variations in the pumps 402 would directly and adversely affect the amount of water vapor being generated within the flash evaporator 406. These variations could cause the pressure within the flash evaporator 406 to vary too far from 0.3 psia, which would result in the generation of too much or too little steam, as discussed above.

Therefore, in one embodiment of the preferred invention, the output of warm sea water from each of the pumps 402 is fed together in pipe 1004, which feeds each flash evaporator 406. A static reservoir 1006 and compressed air source 1008 finely regulate the pressure in the flash evaporators 406.

Figure 9:
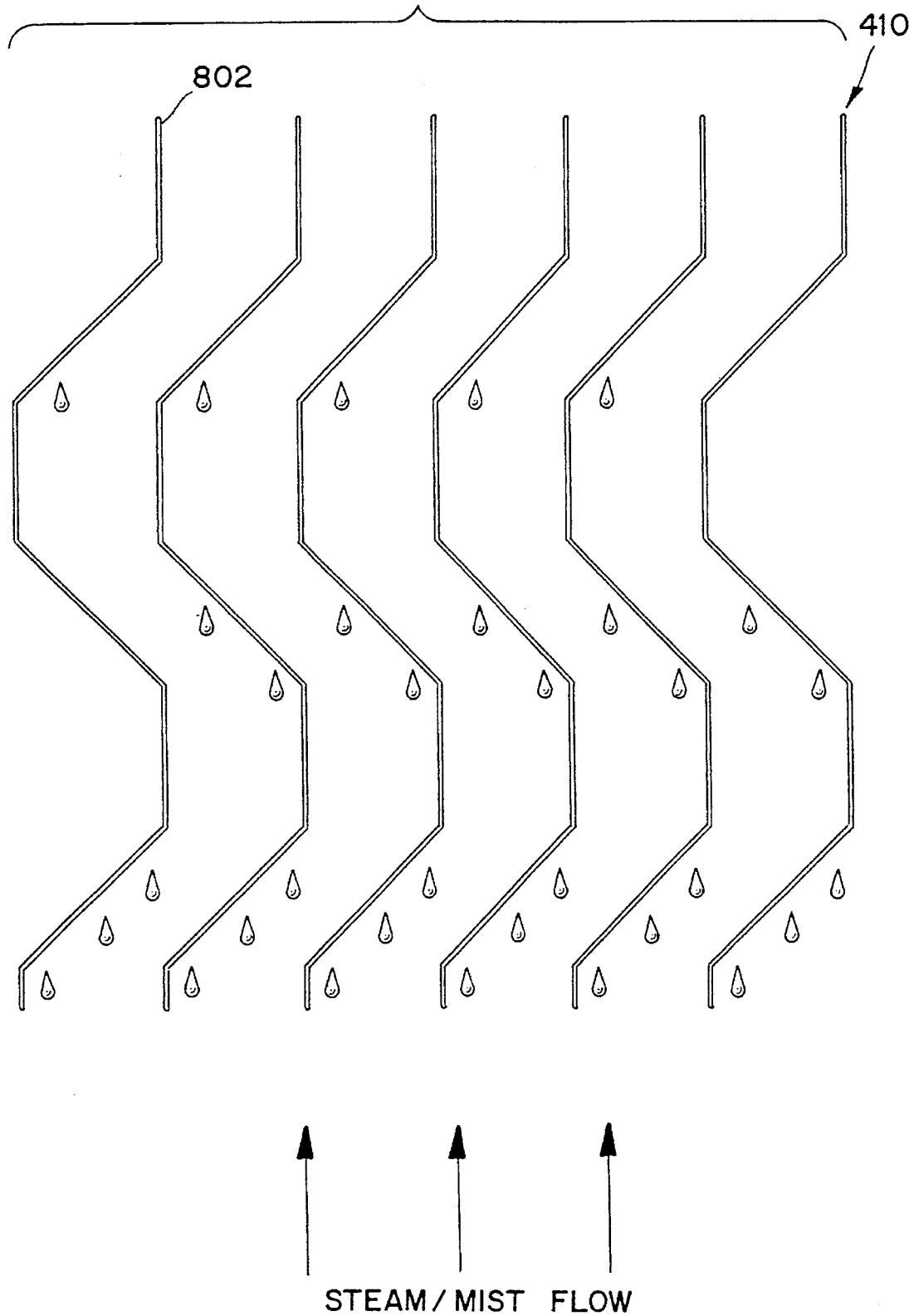
FIG. 9 illustrates a mist eliminator of FIG. 4(a) in one embodiment of the present invention.

In one preferred embodiment, as illustrated in FIG. 9, the mist eliminator 410 is a three pass chevron-style mist eliminator wherein each wall element 802 is 9.68 inches in length and 1.5 inches apart. The water vapor and mist from the flash evaporator 406 are input to the flash evaporator side of the mist eliminator 410. As the combined water vapor and mist flows across the chevron-shaped wall elements 802 of the mist eliminator 410, the larger droplets of mist contact the wall elements 802 of the mist eliminator 410 and fall to the bottom of the flash evaporator 406, where they become part of the warm water discharge. The mist eliminator 410 allows the water vapor to pass through such that the water vapor may be condensed in the fresh water condenser 412.

The invention being thus described, it will be obvious that the same may be varied in many ways. Such variations are not to be regarded as a departure from the spirit and scope of the invention and all such modifications which would be obvious to one of ordinary skill in the art are intended to be included within the scope of the following claims.

What is claimed:

1. An ocean thermal energy conversion (OTEC) system, comprising:

warm sea water receiving means for receiving a warm sea water supply from an ocean cold sea water receiving means for receiving a cold sea water supply from the ocean, warm sea water dividing means for dividing the warm sea water supply into a first and a second warm sea water stream, cold sea water dividing mans for dividing the cold sea water supply into a first and a second cold sea water stream;

desalination means for receiving the first warm sea water stream, flash evaporating a portion of the first warm sea water stream, to produce steam, and condensing the steam by indirect contact with the first cold sea water stream to produce fresh water; and energy generation means for receiving the second warm sea water stream, evaporating a working fluid, by indirect contact with the second warm sea water stream, to produce a working vapor, generating energy from the working vapor, and condensing the working vapor by indirect contact with the second cold sea water stream;

said desalination means further producing a cold sea water discharge and a warm sea water discharge which are not mixed with the second warm sea water stream and the second cold sea water stream received by said energy generation means;

said desalination means including,
flash evaporation means for receiving the first warm sea water stream and flash evaporating the portion of the first warm sea water stream to produce the steam, a mist eliminator for removing mist from the steam, and first condenser means for condensing the steam with the first cold sea water stream to produce the fresh water;

said energy generation means including,
evaporation means for receiving the second warm second water stream and evaporating the working fluid to produce the working vapor,
turbine means for generating the energy from the working vapor, and
second condenser means of condensing the working vapor with the second cold sea water stream.

2. The OTEC system of claim 1, wherein said desalination means is an open-cycle desalination system and wherein said energy generation means is a closed cycle energy system.

3. The OTEC system of claim 1, wherein a primary product of said OTEC system is the fresh water produced by said desalination means.

4. The OTEC system of claim 1, wherein said energy generation means generates enough energy to operate said OTEC system.

5. The OTEC system of claim 1, further comprising:
a single housing for housing said flash evaporation means, said mist eliminator, and said first condenser means.

6. The OTEC system of claim 1, further comprising:
a predeaeration chamber for removing non-condensible gases from the first warm sea water.

7. The OTEC system of claim 6, said predeaeration chamber including a baffle for indirectly routing the first warm sea water stream through said desalination means.

8. The OTEC system of claim 6, further comprising:
seed bubble injection means for injecting seed bubbles into said predeaeration chamber to facilitate evolution of the non-condensible gases.

9. The OTEC system of claim 8, said seed bubble injection means injecting the seed bubbles into said predeaeration chamber from the first warm sea water stream.

10. The OTEC system of claim 8, said seed bubble injection means injecting the seed bubbles into said predeaeration chamber from the atmosphere.

11. The OTEC system of claim 8, said seed bubble injection means injecting the seed bubbles into said predeaeration chamber from the warm sea water discharge.

12. The OTEC system of claim 11, said seed bubble injection means including horizontal piping for creating a region of zero vertical velocity.

13. The OTEC system of claim 11, said seed bubble injection means including stagnant means for creating a stagnant region in the warm sea water discharge.

14. The OTEC system of claim 13, wherein said stagnant means is a baffle.

15. The OTEC system of claim 13, wherein said stagnant means is a discharge pipe with a decreasing diameter.

16. The OTEC system of claim 1, said flash evaporation means including a plurality of evaporation spouts for flash evaporating the portion of the first warm sea water stream to produce the steam.

17. The OTEC system of claim 16, further comprising:
vertical static head pressure regulation means for controlling a pressure at each of said plurality of evaporation spouts.

18. The OTEC system of claim 1, wherein said mist eliminator is a chevron-style mist eliminator.

19. A method of generating fresh water, comprising the steps of:

(a) receiving a warm sea water supply from an ocean;

(b) receiving a cold sea water supply from the ocean;

(c) dividing the warm sea water supply into a first and a second warm sea water stream;

(d) dividing the cold sea water supply into a first and a second cold sea water stream;

(e) flash evaporating a portion of the first warm sea water stream to produce steam;

(f) removing mist from the steam;

(g) condensing the steam by indirect contact with the first cold sea water stream to produce fresh water;

(h) evaporating a working fluid by indirect contact with the second warm sea water stream to produce a working vapor;

(i) generating energy from the working vapor and condensing the working vapor by indirect contact with the second cold sea water stream;

wherein said steps (e) and (g) also produce a warm sea water discharge and a cold sea water discharge, respectively, which are not mixed with the second warm sea water stream of said step (h) and the second cold sea water stream of said step (i), respectively.

20. The method of claim 19, wherein a primary product of said method is the fresh water produced in said step (g).

21. The method of claim 19, wherein the energy generated in said step (i) is sufficient to operate an OTEC system which performs said method.

* * * * *